United States Patent Office

3,383,406
Patented May 14, 1968

3,383,406
PROCESS FOR PRODUCING VINYL ESTERS
René Achard and Philippe Perras, Lyon, France, assignors to Rhône-Poulenc S.A., Paris, France, a French body corporate
No Drawing. Filed Dec. 9, 1964, Ser. No. 417,231
Claims priority, application France, Dec. 26, 1963, 958,498
4 Claims. (Cl. 260—497)

ABSTRACT OF THE DISCLOSURE

In the process for producing vinyl esters of saturated lower aliphatic acids by reacting ethylene with a saturated lower aliphatic acid in the presence of a p-quinone, which is reduced to the corresponding p-diphenol, the rhodium catalysts used in the catalytic reoxidation with oxygen of the diphenol to the quinone are advantageously pretreated with hydrogen in order to promote the rate of oxidation, and reduce the need to replace the catalyst in successive oxidations.

---

This invention relates to the oxidation of hydroquinones to p-quinones.

In application Ser. No. 299,475, filed on Aug. 2, 1963, now Patent No. 3,281,457, and of common assignee with this application, there is described a process for the preparation of vinyl esters of lower fatty acids which comprises reacting ethylene with a lower aliphatic acid in the absence of water and in the presence of a p-quinone, a halide of a noble metal, more particularly palladium chloride, and an alkali metal salt of the aliphatic acid under superatmospheric pressure and at a temperature above the ambient temperature, separating the vinyl ester formed and the catalyst, re-oxidizing the di-phenol produced to the quinone, without separating it, with oxygen in the presence of rhodium as a catalyst, and using the regenerated p-quinone in a further reaction of ethylene with a lower aliphatic acid.

In this process, the consumption of p-quinone is a very important factor in the cost, and it is therefore particularly desirable to be able to regenerate the quinone in the highest possible yield. We have found that in the aforesaid process, the rhodium catalyst employed for the re-oxidation of the hydroquinone loses its activity after a number of re-oxidation cycles and must be partially or completely replaced by fresh catalyst.

It has now been found that the rhodium catalyst used in the aforesaid process may advantageously be pretreated with a reducing agent. Catalysts so treated not only substantially completely retain their activity for a large number of oxidation cycles, but also make it possible to oxidize the hydroquinone more rapidly and in a better yield. It is thus possible to carry out a large number of reduction-oxidation cycles using the same rhodium catalyst without any further addition of fresh catalyst.

The invention accordingly provides a process for the oxidation of a p-diphenol to a p-quinone which comprises oxidizing the said diphenol with oxygen in the presence of, as catalyst, rhodium which has been pre-treated with a reducing agent, preferably hydrogen under superatmospheric pressure.

The new process is especially useful for regenerating p-benzoquinone from the hydroquinone contained in the mother liquors from the preparation of vinyl acetate by the reaction of ethylene with acetic acid in the presence of sodium acetate, palladium chloride and benzoquinone.

The process of the invention is applicable to the production by oxidation not only of quinone, but also of its alkylated homologues, more particularly those having on the nucleus one or two alkyl radicals such as methyl or ethyl, for example 2-methyl-p-benzoquinone, and also of mono- and dihalo-p-benzoquinones, more particularly chloro- and bromo-p-benzoquinones, such as, for example, monochloro-p-benzoquinone, 2,5-dichloro-p-benzoquinone and monobromo-p-benzoquinone.

The invention will be more particularly described in the following with reference to the regeneration of p-benzoquinone in liquors emanating from the production of vinyl acetate in accordance with the above described process, a detailed description of which will be found in the specification of the application referred to above. In that process the aliphatic acid, the quinone, the palladium chloride and the alkali metal salt of the aliphatic acid are introduced into a pressure-resistant apparatus, the atmosphere is purged successively by nitrogen and then by ethylene, and the ethylene is then introduced under pressure. The temperature is then raised to the desired level, the mixture is agitated and the pressure is periodically restored to the original value by further charges of ethylene. When the absorption of the ethylene is complete, the product is distilled under a medium vacuum by heating to the boiling point of the aliphatic acid. The vinyl ester formed passes over with a certain quantity of aliphatic acid and is then isolated by distillation.

The residue from the first distillation is filtered to separate the palladium formed by the reduction of the palladium chloride, and this palladium is reconverted into $PdCl_2$, which is re-used. The filtrate is treated to regenerate the quinone, which has been converted into the corresponding diphenol in the course of the vinylating operation.

In order to regenerate the quinone, there is first added to the filttered residual solution, as catalyst, 0.2% to 5%, preferably 1% to 2%, of rhodium (calculated as weight of metal based on the weight of diphenol to be re-oxidized). This rhodium is subjected to a treatment with a reducing agent before being used, and is preferably used in finely divided form on carbon black.

The simplest and most advantageous reducing agent is hydrogen. The rhodium catalyst is dispersed in an organic solvent (for example in aliphatic acid such as acetic acid when a carbon black support is used) or in water and treated under hydrogen pressure for 10 minutes to one hour at a pressure above 1 bar (pressures between 3 and 50 bars are sufficient) and at a temperature between 0° and 150° C. The treatment is shorter in proportion as the temperature and the pressure are higher. The treated catalyst is then filtered off and separated.

If the operation has been carried out in the presence of an organic acid, it is unnecessary to eliminate all traces thereof before introducing the catalyst into the hydroquinone solution to be oxidized.

The oxygen, either pure or mixed with gases which are inert under the operating conditions, is then reacted with the filtrate by simple bubbling at atmospheric pressure, or in an autoclave under pressure, the pre-treated oxidation catalyst having been added to the filtrate, and the temperature being between 20° and 100° C., and preferably between 50° and 80° C.

The lower the oxygen concentration of the gas, the more advantageous it is to increase the pressure. In practice, good results are obtained by operating with air under a pressure higher than 10 bars or with pure oxygen under a pressure higher than 2 bars. When the oxidation is complete, the catalyst is filtered off, the water formed is eliminated by any appropriate means, for example by azeotropic distillation, and the quinone solution is ready for a further vinylating operation.

The following example illustrates the invention.

EXAMPLE

Into a 4-litre autoclave provided with a stirring and heating system are charged: palladium chloride ($PdCl_2$) (0.890 g., 0.005 mol.); anhydrous sodium acetate (1.025 g., 0.0125 mol.); p-benzoquinone (54 g., 0.5 mol.); and acetic acid (2644 g.).

The air is removed from the autoclave with a current of nitrogen, followed by a current of ethylene, and the vinylation is then carried out with stirring and heating at 80° C., and ethylene pressure of 35 bars being maintained. The absorption is complete at the end of 1½ hours. After cooling to 10° C., the autoclave is degassed, and the reaction mixture is transferred into a distillation apparatus, the autoclave being rinsed with 250 g. of acetic acid which is added to the reaction mixture. The whole is then distilled under a light vacuum (50 mm. Hg) at a temperature not exceeding 50° C. At 38–46° C., vinyl acetate containing acetic acid passes over and a residue of 2528 g. remains consisting of a solution of hydroquinone in acetic acid, which is free from benzoquinone but contains sodium chloride and metallic palladium. By distillation, 39.7 g. of vinyl acetate are separated from the distillate, which represents a yield of 92.3% calculated on the benzoquinone.

The hydroquinone solution in acetic acid which contains 55 g. of hydroquinone, is freed from palladium by filtration, brought to a weight of 2700 g. by the addition of acetic acid, and then re-introduced into the above-described autoclave. 22.8. of rhodium on carbon black, containing 4.83% of metal, i.e. 1.10 g. of metallic rhodium, are added, the said rhodium having been pre-treated by being stirred in suspension in 2000 cc. of acetic acid for 1 hour at 80° C. under hydrogen at a pressure of 25 bars, and then filtered and separated.

Thet hydroquinone solution containing the pre-treated catalyst is heated to 50° C. and oxygen is introduced under a pressure of 5 bars. The pressure is periodically restored to 5 bars by further introductions of oxygen. The absorption ceases after 30 minutes. The contents of the autoclave are cooled and removed from the autoclave, 200 g. of acetic acid being used to rinse out the autoclave. The catalyst is filtered off and rinsed with a further 150 g. of acetic acid. The combined filtrate weighs 3043 g. and contains 53.95 g. of benzoquinone, i.e. a yield of 99.9% based on the benzoquinone initially used. To the solution thus obtained are added 200 cc. of benzene and the mixture is distilled under an absolute pressure of 50 mm. Hg up to the boiling point of the acetic acid, so as to entrain azeotropically the water formed in the oxidizing reaction.

After this distillation, 2700 g. of solution remain, which can be used for further vinylation operations in the manner described above.

The filtered oxidation catalyst is washed with 250 cc. of water, and again treated with hydrogen as described above. It is then ready for a further oxidizing operation.

Five successive vinylating and oxidizing operations are successively performed, the same oxidation catalyst being employed for each oxidation without the addition of fresh catalyst. The quinone losses are compensated for at each vinylating operation and, if necessary, further fresh acetic acid is added to produce the same conditions of dilution as those existing during the first vinylation.

The following Table I gives the yield of vinyl acetate and the yield of p-benzoquinone based on the half-mole of benzoquinone present at the beginning of each vinylating operation.

TABLE I

| Operation | Yield of vinyl acetate in percent | Yield of p-benzoquinone in percent | Duration of the oxidation (minutes) |
|---|---|---|---|
| 1 | 92.3 | 99.9 | 30 |
| 2 | 93.1 | 98.8 | 30 |
| 3 | 92.55 | 99.35 | 35 |
| 4 | 92.60 | 99.45 | 40 |
| 5 | 92.55 | 98.5 | 40 |

It will therefore be seen that 1 kg. of vinyl acetate can be obtained for a benzoquinone consumption of 10.8 g. (the total loss on oxidation).

If the same experiment is repeated, omitting the treatment of the rhodium catalyst with hydrogen, the results shown below in Table II are obtained, using fresh catalyst in each oxidation (if the rhodium catalyst which has been used in operation 1 is also used in operation 2, the oxidation is not complete after 7 hours at 50° C.).

TABLE II

| Operation | Yield of vinyl acetate in percent | Yield of p-benzoquinone in percent | Duration of oxidation |
|---|---|---|---|
| 1 | 92.4 | 99.3 | 2 hr. 10 min. |
| 2 | 93.2 | 98.9 | 2 hr. |
| 3 | 92.3 | 98.3 | 2 hr. 20 min. |
| 4 | 93.6 | 98.85 | 2 hr. 15 min. |
| 5 | 93.7 | 98.2 | 2 hr. 15 min. |

Theses figures show that in the process described:

(1) The oxidation yields obtained are higher than those obtained with the catalyst which has not been pre-treated with a reducing agent;

(2) a single, small quantity of catalyst is sufficient to make possible the regeneration, five times in succession, of the quinone employed;

(3) the average duration of the oxidation of the hydroquinone, is substantially 0.3 time the duration of the oxidation carried out without pre-treating the catalyst with a reducing agent;

(4) the benzoquinone consumption per kg. of vinyl acetate produced falls to 10.6 g. while 17.4 g. are consumed if the catalyst used is not pre-treated with the reducing agent.

We claim:

1. In a process for the production of a vinyl ester of a saturated lower aliphatic acid, which comprises reacting ethylene with a saturated lower aliphatic acid in the absence of water and in the presence of a p-quinone, a catalytic amount of a halide of a noble metal, and an alkali metal salt of the saturated aliphatic acid under superatmospheric pressure and at a temperature above the ambient temperature, separating the vinyl ester formed and the catalyst, re-oxidizing the diphenol with oxygen in the presence of a rhodium metal catalyst, and using the regenerated p-quinone in a further reaction of ethylene with a saturated lower aliphatic acid, the improvement which consists in pre-treating the said rhodium catalyst with hydrogen at 0° to 150° C. and under superatmospheric pressure.

2. The improvement according to claim 1 in which the said rhodium catalyst is in finely divided form on carbon black.

3. The improvement according to claim 1 in which the said rhodium catalyst has already been used in a previous re-oxidation.

4. In a process for the production of a vinyl ester of a saturated lower aliphatic acid, wnich comprises reacting ethylene with a saturated lower aliphatic acid in the absence of water and in the presence of a p-quinone, a catalytic amount of a halide of a noble metal, and an alkali metal salt of the saturated aliphatic acid under superatmospheric pressure and at a temperature above the ambient temperature, separating the vinyl ester formed and the catalyst, re-oxidizing the diphenol with oxygen under superatmospheric pressure at 50° to 80° C. in the presence of, as catalyst, rhodium in finely divided form on carbon black, and using the regenerated p-quinone in a further reaction of ethylene with a lower aliphatic acid, the improvement which consists in pretreating the said rhodium catalyst with hydrogen at 0° to 150° C. under superatmospheric pressure.

References Cited

UNITED STATES PATENTS 3,183,278 5/1965 Koch _____ 260—667
3,281,457 10/1966 Achard et al. _____ 260—497

LORRAINE A. WEINBERGER, *Primary Examiner.*

VIVIAN GARNER, *Assistant Examiner.*